(12) United States Patent
Hui et al.

(10) Patent No.: US 7,119,494 B2
(45) Date of Patent: Oct. 10, 2006

(54) CIRCUIT DESIGNS AND CONTROL TECHNIQUES FOR HIGH FREQUENCY ELECTRONIC BALLASTS FOR HIGH INTENSITY DISCHARGE LAMPS

(75) Inventors: Shu Yuen Ron Hui, Kowloon (HK); Shu-hung Chung, Kowloon (HK)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 10/056,226

(22) Filed: Jan. 23, 2002

(65) Prior Publication Data
US 2002/0145393 A1    Oct. 10, 2002

Related U.S. Application Data

(60) Provisional application No. 60/263,737, filed on Jan. 24, 2001.

(51) Int. Cl.
H05B 37/02 (2006.01)

(52) U.S. Cl. .................. 315/219; 315/224; 315/244; 315/307

(58) Field of Classification Search ............ 315/307, 315/244, 224, 219
See application file for complete search history.

(56) References Cited

U.S. PATENT DOCUMENTS

| | | | |
|---|---|---|---|
| 4,277,728 A | 7/1981 | Stevens | |
| 5,001,400 A | 3/1991 | Nilssen | |
| 5,003,231 A | 3/1991 | Perper | 315/291 |
| 5,241,242 A * | 8/1993 | Daub | 315/82 |
| 5,381,076 A | 1/1995 | Nerone | |
| 5,434,763 A | 7/1995 | Hege et al. | 362/265 |
| 5,475,284 A * | 12/1995 | Lester et al. | 315/209 R |
| 5,677,602 A | 10/1997 | Paul et al. | |
| 5,739,645 A * | 4/1998 | Xia et al. | 315/307 |
| 5,932,976 A * | 8/1999 | Maheshwari et al. | 315/291 |
| 6,002,215 A * | 12/1999 | Yamashita et al. | 315/308 |
| 6,020,691 A | 2/2000 | Sun et al. | 315/307 |

(Continued)

FOREIGN PATENT DOCUMENTS

CN    1230871    10/1999

(Continued)

OTHER PUBLICATIONS

Yan et al., "Stability study and control methods for small-wattage high-intensity-discharge (HID) lamps," *IEEE Transactions on Industry Applications*, 37:5, 1522-1530 (2001).

(Continued)

*Primary Examiner*—David Vu
(74) *Attorney, Agent, or Firm*—Merchant & Gould P.C.

(57) ABSTRACT

The present invention provides an electronic ballast for a high intensity discharge lamp such as a metal halide lamp. The ballast includes an inverter and a resonant circuit with an ignition capacitor between the resonant circuit and the lamp. The ignition capacitor serves to provide the necessary start-up energy and also serves to provide a low impedance discharge path. A single ignition capacitor may be sufficient, but if a long cable is used to connect the lamp to the ballast, then two ignition capacitors in parallel at opposite ends of the cable may be used. The ballast further provides means for monitoring and controlling lamp power by monitoring a nominally constant dc link voltage, and means for detecting short-circuit and open circuit conditions. A retrial mechanism is provided in the event of the lamp failing to ignite that includes a temporary disabling of the inverter in order to keep the rms lamp voltage low.

13 Claims, 3 Drawing Sheets

Schematic diagram of the proposed ballast.

U.S. PATENT DOCUMENTS

| | | | |
|---|---|---|---|
| 6,181,076 B1 * | 1/2001 | Trestman et al. | 315/224 |
| 6,181,080 B1 * | 1/2001 | Schleicher | 315/248 |
| 6,222,322 B1 * | 4/2001 | Stack | 315/119 |
| 6,316,887 B1 * | 11/2001 | Ribarich et al. | 315/307 |

FOREIGN PATENT DOCUMENTS

| | | |
|---|---|---|
| EP | 0 948 246 | 10/1999 |
| JP | 4-322169 | 11/1992 |
| JP | 7-94291 | 4/1995 |
| JP | 7-169584 | 7/1995 |
| JP | 11-503866 | 3/1999 |
| JP | 11-262256 | 9/1999 |
| JP | 11-283769 | 10/1999 |
| JP | 2000-134941 | 5/2000 |
| JP | 2000-277278 | 10/2000 |
| JP | 2002-503023 | 1/2002 |
| WO | 96/33596 | 10/1996 |
| WO | 99/40757 | 8/1999 |
| WO | 00/30413 | 5/2000 |

OTHER PUBLICATIONS

Brañas, et al., "Electronic Ballast for HPS Lamps with Dimming Control by variation of the Switching Frequency, Soft Start-up Method for HPS and Fluorescent Lamps", Industrial Electronics Society, 1998, IECOn 98, Proceedings of the 24th Annual Conference of the IEEE AACHEN,. Germany Aug. 31, Sep. 4, 1998, New York, NY, USA, IEEE, US, pp. 953-958.

* cited by examiner

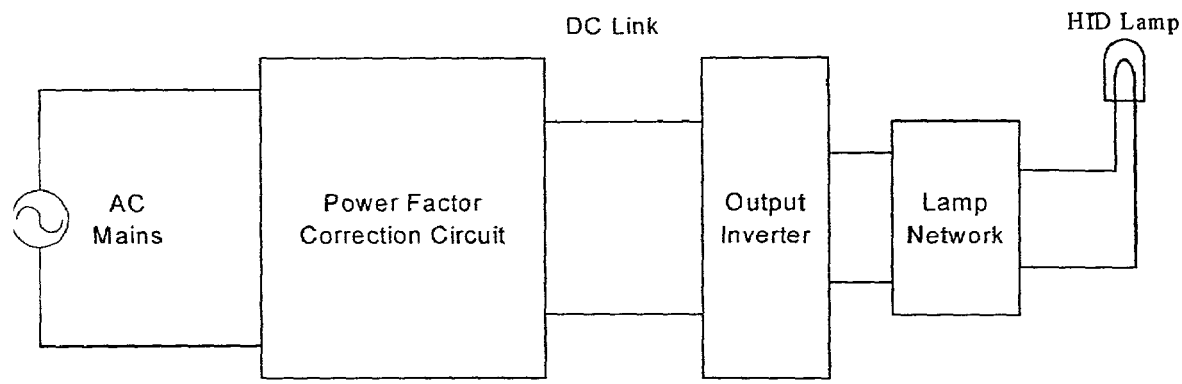
Fig. 1 Typical circuit configuration.
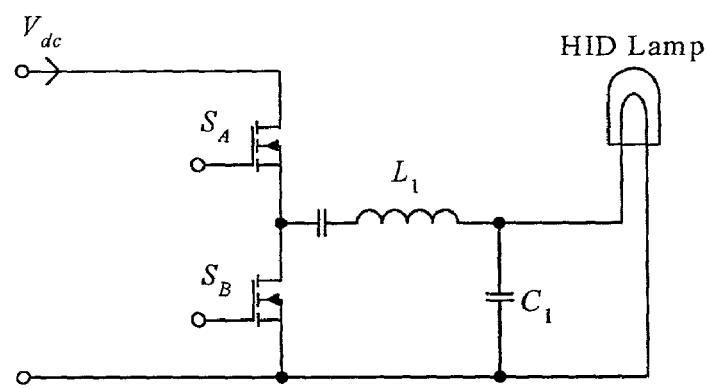
Fig. 2 Lamp network using L-C circuit. (Prior Art)
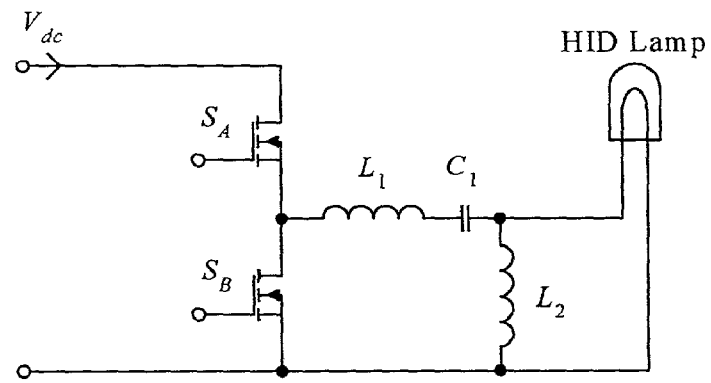
Fig. 3 Lamp network using L-C-L circuit. (Prior Art)

Fig. 4 Schematic diagram of the proposed ballast.

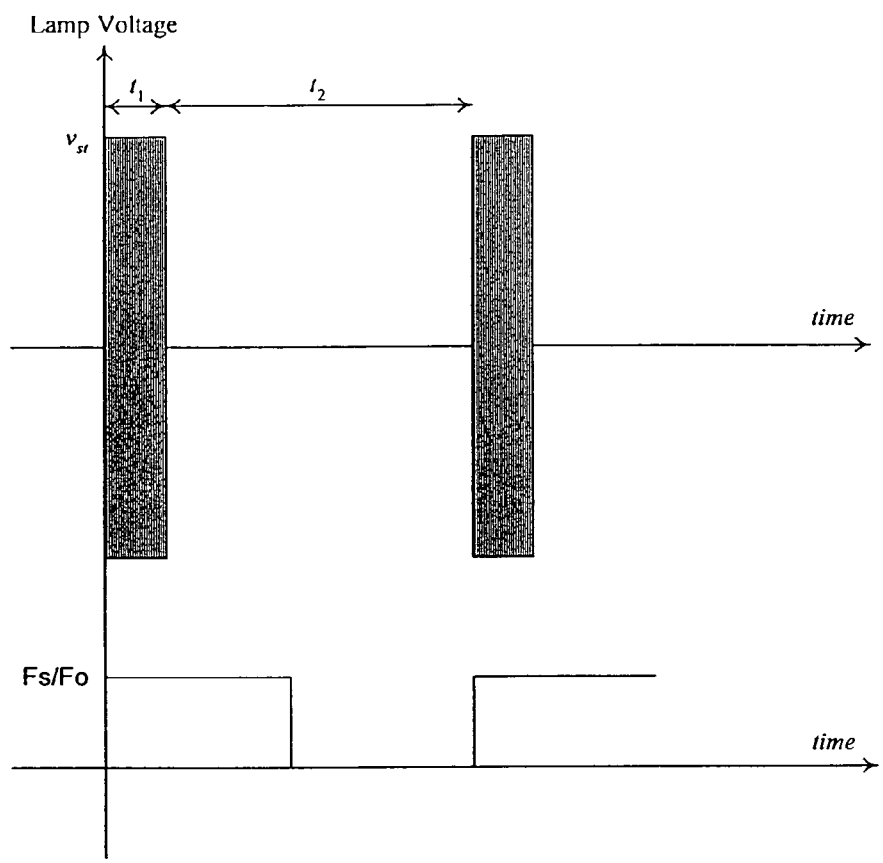
Fig. 5 Typical waveforms of the lamp voltage and Fs/Fo signal during the start-up process with root-mean-square voltage limiting feature.

CIRCUIT DESIGNS AND CONTROL TECHNIQUES FOR HIGH FREQUENCY ELECTRONIC BALLASTS FOR HIGH INTENSITY DISCHARGE LAMPS

This application is a non-provisional filing based on U.S. Provisional Application Ser. No. 60/263,737, filed 24 Jan. 2001.

FIELD OF THE INVENTION

This invention relates to novel circuit designs and control techniques for high frequency (from 20 kHz to 1 MHz) electronic ballasts for high-intensity-discharge (HID) lamps, such as metal-halide lamps, to ensure successful startup of lamps and to provide circuit protection. The present invention relates in particular, though not exclusively, to ballasts that are suitable for discharge lamp system in which the HID lamp is connected to the ballast circuit via long cable.

BACKGROUND OF THE INVENTION

Among various light sources, high-density-discharge (HID) lamps exhibit the best combination of the high luminous efficacy and good color rendition with the high power compact source characteristics. HID lamps have been used in many applications, such as wide area floodlighting, stage, studio, and entertainment lighting to UV lamps.

The use of a high frequency electronic ballast can reduce the size and the weight of the ballast and improve the system efficacy. This feature is especially attractive for low wattage HID lamps because the overall lighting system is expected to be of small size. Moreover, as the operating frequency increases, the re-ignition and extinction peaks disappear, resulting in a longer lamp lifetime. The load characteristic of a HID lamp can be approximated as a resistor and the lamp (power) factor approaches unity. There is no flickering effect and the stroboscopic effect in the light output and the light lumen can be improved. However, the operation of high pressure HID lamps with high-frequency current waveforms is offset by the occurrence of standing pressure waves (acoustic resonance). This acoustic resonance can lead to changes in arc position and light color or to unstable arcs. Instability in the arcs can sometimes cause the arcs to extinguish.

The common explanation for acoustic resonance is that the periodic power input from the modulated discharge current causes pressure fluctuations in the gas volume of the lamp. If the power frequency is at or close to an eigenfrequency of the lamp, traveling pressure waves will appear. These waves travel towards and reflect on the discharge tube wall. The result is standing waves with large amplitudes. The strong oscillations in the gas density can distort the discharge path, which in turn distorts the heat input that drives the pressure wave (W. Yan, Y. K. E. Ho, and S. Y. R. Hui, "Stability study and control methods for small-wattage high-intensity-discharge (HID) lamps," *IEEE Transactions on Industry Applications*, vol. 37, no. 5, pp. 1522–1530, September–October 2001). The lamp eigenfrequencies depend on arc vessel geometry, gas filling and gas thermodynamic state variables (such as pressure, temperature and gas density).

PRIOR ART

Many articles on ballast circuit topologies or control methods have been proposed to avoid instability caused by acoustic resonance (Yan et al, and J. D. Paul and R. Redl, "High efficiency electronic ballast for high intensity discharge lamps," U.S. Pat. No. 5,677,602, Oct. 14, 1997).

A typical circuit arrangement is shown in FIG. 1. Basically, it consists of a power factor correction circuit, an output inverter, and a lamp network. There are two basic approaches to deal with acoustic resonance:

1) The output inverter is operated at a frequency well away from frequencies in the acoustic resonance range of the lamp. Those ballasts can be categorized into (i) dc-type ballast, (ii) tuned high-frequency ballast, and (iii) very high-frequency ballast.
2) The switching frequency of the output inverter is modulated with fixed or random frequency. The input energy spreads over a wide spectrum, so as to minimize the magnitude of the input energy in a certain frequency.

A lamp will go through several stages during the ignition process. The transitions are as follows: To begin with the resistance of the lamp is extremely large (approximating an open circuit), then becomes nearly zero (short-circuit transition) for a short period, and finally increases again until it reaches a steady state. Sufficient energy and a low impedance discharge path must be available for fast discharge during start-up. Thus, the loading effect of (1) the lamp resistance and (2) the impedance of the cable connecting the lamp and the ballast circuit on the lamp network can sometimes be large enough that the initial arc current fails to sustain and the lamp extinguishes. Thus, sufficient energy to sustain the current and a low-impedance current discharge should be available during the ignition period. The situation is particularly serious if a long cable is used to connect the lamp and the ballast, because long cables have relatively large inductance that will limit the rate of change of current $di/dt$. Because of the above transition characteristics, it is difficult to identify whether the ballast circuit output is short-circuited or the lamp in normal operation.

Many previous ballasts did not provide sufficient discharge arc current from the ballast to maintain the arc just after starting. If the initial discharge current is not sufficient, the lamp will try to turn on but the arc will turn off quickly because of insufficient energy to sustain the arc in the arc tube. This often results in lamp flickering and/or unreliable lamp operation. Moreover, the open circuit and short circuit protection circuits in some prior art designs are based on monitoring the lamp voltage and current. The control logic is complicated, in order to differentiate between lamp fault or normal operation.

U.S. Pat. Nos. 4,277,728, 5,001,400, and 5,381,076 use a front-end power factor correction circuit and an output inverter, whose output supplies a fluorescent lamp through a series inductor and a shunt capacitor—an L-C circuit as shown in FIG. 2. In general, a dc blocking capacitor is connected in series to the L-C Circuit. This dc blocking capacitor eliminates the dc offset voltage so that only ac voltage is applied across the lamp.

US. Pat. No. 5,677,602 uses a series inductor-capacitor circuit and a parallel inductor—an $L_1$-$C_1$-$L_2$ circuit as shown in FIG. 3. The ballast is operated at a very high frequency. The inductance of the parallel inductor $L_2$ is much higher than the series inductor $L_1$. Multiple frequency shifting is used in starting and operating the lamp. That is, the lamp is operated at a relatively low operating frequency during ignition and then a relatively high frequency under steady-state conditions. The major limitation of this circuit is the use of a large $L_2$. While the resonant voltage of $L_2$ is large for igniting the lamp, the large impedance of $L_2 (=2\pi f L_2$, where f is the operating frequency of the inductor) limits the rate of change di/dt of the startup discharge current in the lamp arc. Consequently, the lamp arc may have to keep on striking for many times before it can be established. In the worst case, the arc may not be established at all. This situation is even worse if long connection cables are used between the ballast and the lamp. If the lamp is suddenly taken out or if the lamp fails to operate suddenly, a high voltage will be generated across the lamp connector because the currents of $L_1$ and $L_2$ are inconsistent. That is, the current in $L_1$ is different from that in $L_2$. In addition, the soft-switching condition will be lost because the impedance of $L_2$ is so large (equivalent to an open circuit) that the current through $L_1$ cannot be maintained continuously. Soft-switching can be maintained in a half-bridge inverter when the current in the inverter is maintained continuously. The continuous current in the circuit can flow through the anti-parallel diode of the incoming (ie the switch about to be turned on) power switch of the inverter. The conducting anti-parallel diode of the incoming power switch will clamp to the voltage across the power switch to a near-zero voltage condition, therefore creating a soft (zero-voltage) switching condition for the power switch. Without the proposed ignition capacitor in parallel to $L_2$, the switching devices may be subject to hard switching and be damaged by the thermal and/or voltage stresses subsequently.

Many of the circuits described in the prior art have not considered the means to maintain the arc current in the "short-circuited" transition. In particular, for applications with long connection cables between the high-frequency ballast and the lamp, it is important to consider the inductive effect of cables. Techniques incorporating open-circuit and short-circuit protections of the ballast are complicated. Moreover, many existing ballast circuits have not considered the root-mean-square (rms) open-circuit voltage at the output of the ballast circuit. This open-circuit voltage of the ballast circuit is also the ignition voltage of the HID lamps. The ignition voltage for HID lamps is in the order of several kilo-volts. This rms value of this open-circuit voltage should be limited, as a protective measure against serious electric shock and also as a high reliability measure against having prolonged high voltage across faulty lamps.

SUMMARY OF THE INVENTION

According to the present invention there is provided an electronic ballast for a high intensity discharge lamp, comprising: an inverter circuit and a resonant circuit, and wherein at least one ignition capacitor is provided between the resonant circuit and the lamp.

By providing an ignition capacitor there is provided a source of energy for the start-up, while at the same time it provides a low impedance discharge path.

A single ignition capacitor may be provided, or alternatively, especially if the lamp is connected to the ballast by a long cable, two ignition capacitors are provided in parallel with each other, a first of the ignition capacitors being located physically proximate to the inverter circuit and the resonant circuit, and the second of the ignition capacitors being located proximate the lamp and separated from the first ignition capacitor by a cable.

In a preferred embodiment the inverter circuit comprises two switches and means are provided for varying the switching frequency of said inverter circuit. In particular the inverter circuit may be operated at a low frequency during an ignition step and at a high frequency during steady state operation.

Preferably means are provided for regulating the lamp power during steady state operation by varying the switching frequency of the inverter. In particular this may be achieved by indirectly monitoring lamp power by monitoring a dc link current, and by varying the switching frequency of the in response to an output from a current controller.

In a preferred embodiment of the invention means are provided whereby in the event of ignition failure the ballast is disabled and a further attempt to ignite the lamp is made after a preset time interval. Success or failure of the ignition may be detected by comparing the lamp current with a reference current, and in the event of ignition succeeding and the lamp current being higher than the reference current, the ballast is then operated at a high switching frequency. More preferably still, an attempt to ignite the lamp is made an ignition voltage is generated for a relatively short duration only such that even if repeated attempts are made to ignite the lamp the rms lamp voltage remains below a preset value determined by safety considerations.

In a preferred embodiment the present invention further includes means for detecting a short-circuit or open circuit condition at said lamp. Preferably the short-circuit and open circuit detecting means comprises means for detecting when a dc link current falls below a reference value. It is also preferred that the short-circuit and open circuit detecting means is not activated during a lamp ignition step in order to avoid any false warnings of a short-circuit or open circuit.

Preferably the ballast further comprises means for maintaining the lamp current at a level higher than its steady state level for a predetermined period of time following ignition to accelerate warming of the lamp plasma.

According to a further broad aspect of the present invention there is provided an electronic ballast with a nominally constant dc link voltage for a high intensity discharge lamp, comprising: an inverter circuit, a resonant circuit, and means for detecting a short circuit or open circuit condition at said lamp.

According to a still further broad aspect of the present invention there is provided an electronic ballast for a high intensity discharge lamp, comprising an inverter circuit and a resonant circuit, wherein the switching frequency of the inverter circuit may be varied for regulating lamp power in response to a monitored dc link current.

According to a still further broad aspect of the invention there is provided an electronic ballast for a high intensity discharge lamp, comprising: an inverter circuit, a resonant circuit, means for disabling the ballast in the event that the lamp fails to ignite in a start-up process, and means for making a further attempt to ignite the lamp after a predetermined interval.

BRIEF DESCRIPTION OF THE DRAWINGS

Some embodiments of the invention will now be described by way of example and with reference to the accompanying drawings, in which:

FIG. 1 illustrates a typical circuit configuration in the prior art,

FIG. 2 illustrates an example of the prior art using an L-C circuit,

FIG. 3 illustrates an example of the prior art using an L-C-L circuit,

FIG. 4 is a schematic diagram illustrating an embodiment of the present invention, and FIG. 5 shows typical waveforms of the lamp voltage and Fs/Fo signal during the start-up process with root-mean-square limiting.

DETAILED DESCRIPTION OF PREFERRED EMBODIMENTS

A. Circuit Schematic of a Ballast for a High Intensity Discharge Lamp

Figure 4:
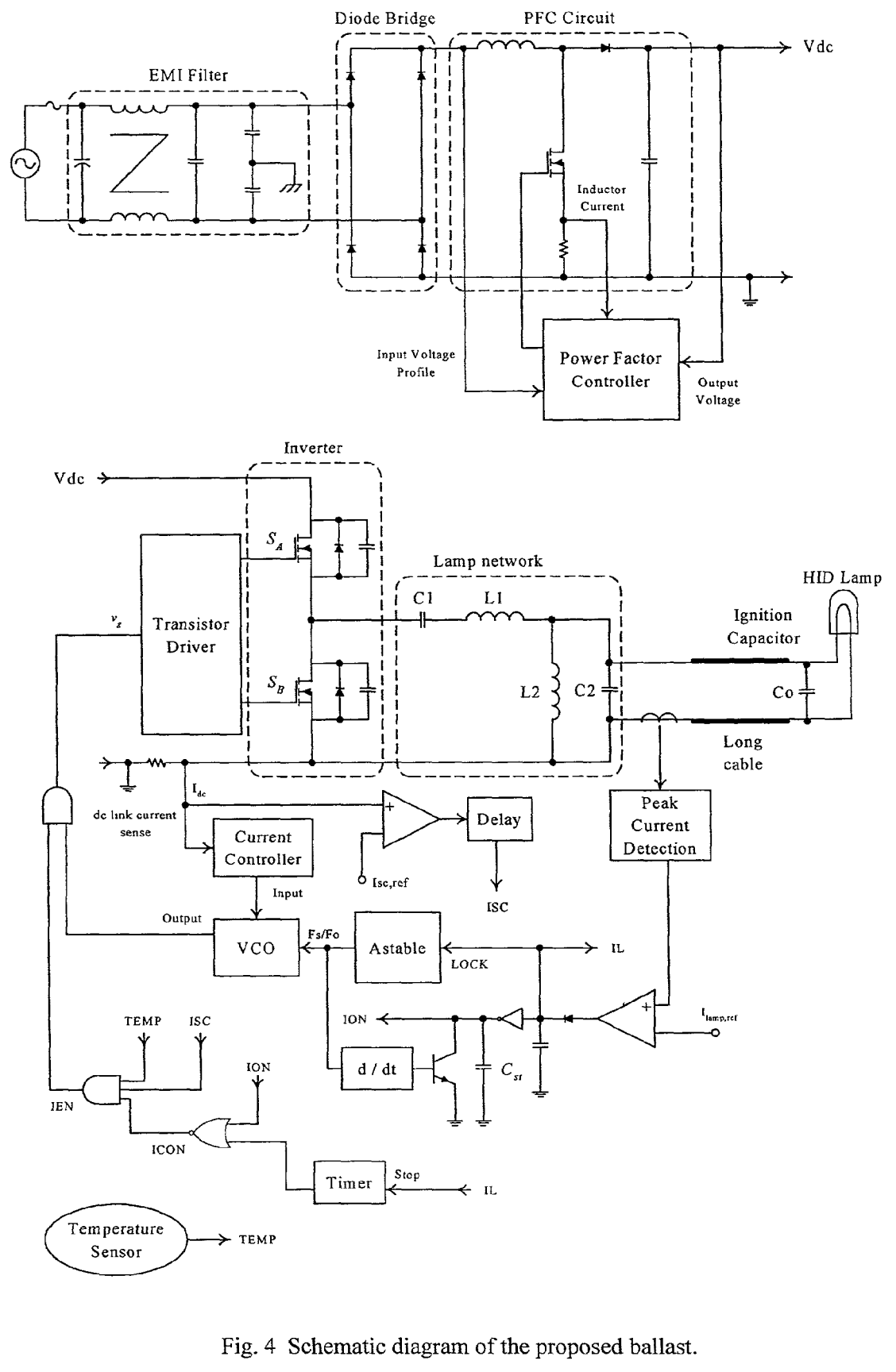

A circuit schematic of an electronic ballast according to a preferred embodiment of the invention is shown in FIG. 4. The power circuit consists of the following components:

1. Electromagnetic interference (EMI) filter—This is used to suppress the noise, that is generated by the ballast, from getting into the supply mains.
2. Diode bridge—This is a full-wave rectifier and its major function is to rectify the ac mains voltage into a dc voltage.
3. Power factor correction (PFC) circuit—The major function of the PFC circuit is to shape the input current waveform sinusoidally and to keep the input current in phase with the input voltage. The most common circuit topology for the PFC is a boost type dc power converter. This ensures that the input current of the boost converter follows the rectified input voltage. Moreover, a stable dc voltage $V_{dc}$ is regulated at the output. In this circuit example, the initial switching frequency is set at about 50 kHz and the steady-state switching frequency is about 400 kHz. The HID lamp is of metal-halide (MH) type. The dc link voltage is regulated at 380V. The controller IC is MC33262. The converter is operating in critical mode. (Apart from a boost type converter, other converter topologies such as SEPIC, flyback and Cuk converters with appropriate control methods can also be used for power factor correction purposes.)
4. Inverter—The function of the inverter is to convert the regulated dc output voltage from the PFC into symmetrical rectangular wave output. The high-side and low-side driving signals have a dead time (typically of 200 ns) for avoiding short-circuit of the dc link. The switching frequency of the inverter is controlled by the voltage-controlled-oscillator (VCO). The switches are enabled by the control signal 'IEN'.
5. Lamp network—This is a network consisting of an $L_1$-$C_1$-$L_2$-$C_2$ circuit and provides the functions of (i) generating sufficient voltage to startup the lamp and (ii) filtering the high-frequency components at the inverter output.
6. Ignition capacitors $C_2$ and $C_0$—The energy-storage component is an important component in the circuit and is connected across the lamp and also across a resonant component. (In this circuit example in FIG. 4, $C_2$ is connected across resonant inductor $L_2$ and $C_0$ directly across the lamp at the other end of the cable.) The functions of the ignition capacitors are two-fold. Firstly, they retain the high voltage generated by the lamp (resonant) network for causing the arc to strike during ignition. Secondly, they provide sufficient energy and low-impedance discharge paths in the initial ionization process so that the arc can be established easily. Otherwise, the arc may break easily and the lamp will not be turned on. For applications in which short cables are used to connect the ballast circuit and the lamp, $C_0$ and $C_2$ can be combined as one single ignition capacitor because the stray inductance in the short cable is small and thus will not slow down the start-up discharge current.

Moreover, when the lamp is taken out or when the lamp fails to operate suddenly, the difference between the currents of $L_1$ and $L_2$ can be absorbed by $C_0$ and $C_2$. Thus, generation of high voltage due to the inductive (L di/dt) effect can be avoided. Moreover, $C_0$ and $C_2$ provide an additional current path for the series inductor (even if the lamp is open circuited) to ensure soft switching of the switching devices.

B. Features of the Ballast

The ballast provides the following features:

1. The ballast generates a sufficiently high voltage, typically 3–5 kV, to ignite the lamp during ignition. At the same time, however, it has a safety feature of having the rms value of the ignition voltage limited to a low and safe value.
2. The ballast regulates a constant power supply to the lamp.
3. The ballast consists of a L-C-L-C circuit that provides functions including high-voltage start-up, fast discharge process (i.e., fast turn-on of lamp) and steady-state lamp power control.
4. The lamp is driven at a high frequency under steady-state condition, in order to avoid acoustic resonance of the lamp.
4. The ballast has several protection features. In particular, it will be shut down when
   a. the lamp side (connection) is either open circuit or short circuit,
   b. the ballast is overheated,
   c. the ballast has powered the lamp for a predefined duration (say 10–15 minutes) and the lamp has still not been turned on.
5. The length of the cable between the ballast and the lamp can be varied (typically from 5 cm to 10 m).

C. Stages of Operation

As shown in FIG. 4, when the ballast is powered up, the PFC controller controls the boost converter (or other preferred PFC converter) so that $V_{dc}$ is regulated to a stable level (within a certain tolerance) and the input current at the ac mains is near sinusoidal and in phase with the input ac voltage. Therefore, the power delivered to the ballast inverter and the lamp is controlled by adjusting the dc link current $I_{dc}$, because the average power sent to the lamp is the product of $V_{dc}$ (which is regulated) and $I_{dc}$. That is, the average lamp power is $V_{dc} \times I_{dc}$, assuming that the power loss in the inverter and lamp network is small when compared with the lamp power.

In fact, the ballast goes through several stages before entering into the steady state. The switching frequency of the inverter is operated at low frequency during startup and at high frequency after ignition. The frequency of the voltage controlled oscillator (VCO) output controls the switching frequency of the switches in the inverter. This switching or gate signal $v_g$ (connected to the gate of the power MOSFETs) is enabled by the signal 'IEN' for dictating the states of the switches in the inverter. The gate signal $v_g$ determines the switches' operations. If $v_g$='1', the upper switch $S_A$ is on and the lower switch $S_B$ is off. If $v_g$='0', $S_A$ is off and $S_B$ is on. If IEN='0', $v_g$='0' and the inverter's switching operation is disabled. If IEN='1', $v_g$ will be same as the VCO output. The transistor driver generates required dead time between the gate signals applying to $S_A$ and $S_B$.

'IEN' is controlled by three inputs, including 'ISC', 'ICON', and 'TEMP'. The inverter is enabled with the three signals in logic '1'. The functions of each signal are described below:

i. 'ISC' is a command coming from the short circuit protection circuit. 'ISC'='1' if there is no short circuit at the lamp connector. The operation of the short circuit protection circuit will be described further below.

ii. 'ICON' is a command coming from the module for sensing lamp current. If the lamp is turned on within a preset time period (which is determined by a timer—the output signal of the timer is in logic '1' when the ballast has been powered up for a preset time period (say 15 minutes) but without lamp current), 'ICON'='1'.

iii. 'TEMP' is a command coming from the temperature sensor. If 'TEMP'=0, the measured hot spot inside the circuit is overheated.

C.1. Startup or Ignition Process

This section describes a novel start-up control mechanism and methodology for electronic ballasts for HID lamps in accordance with an embodiment of the present invention.

In order to ignite the HID lamp, a sufficiently high start-up voltage $v_{st}$ of a few kilo-volts is generated across the lamp. The method is based on the lamp network in FIG. 4. As the lamp resistance is extremely high at the beginning, the lamp network is simply an LC resonant tank circuit formed by $L_1$, $L_2$, $C_1$, and $C_2$. This resonant tank is designed to operate at two different frequency regions. $L_2$ is much (typically at least ten times) larger than $L_1$. During the start-up or ignition period, the ballast inverter is operated at a relatively low frequency $f_L$ so that the dominant resonant tank is formed by $C_1$ and $L_2$. The reactance of $C_2$ is much larger than (>10 times) that of $L_2$. After the lamp ignition, the lamp resistance is substantially reduced. The ballast inverter is then operated at a relatively high frequency $f_H$. The impedance of $L_2$ and $C_2$ are much higher than the lamp resistance and the effective resonant circuit is formed by $C_1$, $L_1$ and the lamp resistance.

As the switching frequency is low at startup and $L_1 \ll L_2$, $L_2$ is the dominant component in the resonant tank. This start-up voltage $v_{st}$ will be maintained for a preset duration $t_1$ and then stop for another preset duration $t_2$, so that the root-mean-square value $v_{1,rms}$ can be set at a value lower than a given limit (required by safety regulations) for safety reason. FIG. 5 depicts the lamp voltage waveform at startup. Mathematically, $$v_{1,rms} = \sqrt{\frac{v_{st}^2 t_1}{t_1 + t_2}} \quad (1)$$

This is a safety protection against prolonged high voltage generation across the lamp connections.

It will be understood that the lamp circuit shown in FIG. 4 is just one example of possible resonant circuits that can be used for high-frequency operation of the electronic ballasts for HID lamps in accordance with embodiments of this invention. An important aspect of the present invention, at least in preferred forms, is the use of the lamp network (resonant circuit) together with the ignition capacitors $C_2$ and $C_0$. These ignition capacitors are connected across the lamp and also across a start-up resonant component of the lamp network ($L_2$ in FIG. 4 in the circuit example). Normally one capacitor $C_2$ is sufficient for short connection cable to the lamp. Additional capacitor $C_0$ is connected locally to the lamp for long connection cable. The function of $C_2$ and/or $C_0$ is two-fold. First, they provide the high voltage (typically a few kilo-volts) generated by the resonant component of the resonant tank in the lamp network for causing the lamp to ignite. Second, as an energy storage element and a component of low impedance during a capacitor discharge condition, these ignition capacitors can provide sufficient energy and fast current discharge paths for the arc to strike and for sustaining the arc during the initial stage of the establishment of the arc.

The choice of the capacitance $C_2$ and $C_0$ has to meet at least two conditions. First, they should be small enough so that they will not affect significantly the resonant operation of the lamp network during the ignition process. In the circuit example in FIG. 4, the impedance of the capacitors $C_2$ and $C_0$ during the ignition period should be much larger (typically ten times or more) than that of $L_2$ so that the resonance of $C_1$ and $L_2$ will not be affected significantly. The use of $C_2$ and $C_0$ is important in the ignition process because it allows a low-impedance discharge path for the ignition current in the lamp. Second they should store sufficient energy to sustain the initial arc so that the lamp can be turned on quickly.

C.2. Retrial Mechanism

This section describes a novel start-up control process for electronic ballasts for lighting systems and is particularly suitable for HID lamps.

As shown in FIG. 4, the astable multivibrator generates the signal 'Fs/Fo', which has two logic levels, either '0' or '1'. The period of the signal 'Fs/Fo' is 50 ms. This 'Fs/Fo' signal is used to control the 'center frequency' of the voltage-controlled-oscillator (VCO) output. If the signal is '0', the center frequency is about 400 kHz (i.e. high frequency $f_H$) in the circuit example. If the signal is '1', the center frequency is 50 kHz (i.e. low frequency $f_L$). Thus, the frequency of the VCO output is switched between $f_L$ and $f_H$ alternately. Normally, low-frequency operation is used for igniting the lamp while high-frequency operation is used for operating the lamp continuously after ignition. The ignition voltage waveform in FIG. 5 is generated by synchronizing 'Fs/Fo' with the signal 'ION'. As the lamp current is zero at the beginning, 'ION' is in logic '1'. Hence, 'IEN'='0', implying that the inverter is disabled. In order to generate a low-frequency gate signal to the inverter, the capacitor $C_{st}$ is discharged instantaneously at the rising edge of 'Fs/Fo' (i.e., when the output frequency is changed from $f_H$ to $f_L$ or at the start of the low-frequency retrial operation). Hence, 'ION' is temporarily in logic '0' and 'IEN'='1'. The inverter is also temporarily enabled. $C_{st}$ controls this retrial duration. If $C_{st}$ is large, $t_1$ in (1) is longer.

If the lamp cannot be ignited, 'ION' will be recovered to logic '1' after $t_1$ and the inverter is then disabled. Another retrial operation will be taken after $t_2$.

If the lamp can be ignited, the sensed lamp current will be larger than a reference value $I_{lamp,ref}$ which is preset at a small value. The sensed lamp current is compared to $I_{lamp,ref}$. 'IL' will be in logic '1'. 'ION' will be in logic '0' and 'ICON' and 'IEN' are both in logic '1'. The inverter will be enabled. The astable output level will be locked at logic '0' by 'IL' to the 'LOCK' pin of the astable and the timer will stop counting. The VCO will output a high-frequency signal to the inverter. The lamp is then entering into the steady state.

By means of this retrial mechanism, if an attempt to ignite the lamp fails, then the inverter is temporarily disabled for the period $t_2$ and then the inverter is re-enabled and another attempt is made to ignite the lamp by operating the inverter at a low-frequency. By appropriately selecting the time period before the retrial, the rms lamp voltage can be kept low and below the limits set by safety regulations. Once the lamp does ignite, then the inverter is operated in the steady-state high frequency condition.

C.3. Steady State Operation

As the lamp voltage varies greatly from a few kilo-volt during ignition to a few hundred voltage during steady-state, it is not economical to use a direct voltage sensor across the lamp. Moreover, the voltage sensor output will vary widely throughout the operation. In this section, there is described a simple power control technique for controlling the lamp power and its stability without directly sensing the lamp voltage and lamp current.

The method is to monitor the nominal dc power supplied to the half-bridge inverter circuit. As $V_{dc}$ is regulated, the lamp power can be controlled by adjusting the dc link current using the "current controller". The controller output adjusts the switching frequency (around $f_H$) by controlling the VCO input. If the lamp power is decreased, $I_M$ is also decreased. Therefore, the VCO input will be decreased, in order to increase the power inputting to the inverter, and vice versa.

C.4. Open Circuit and Short Circuit Protections

Another important aspect of the present invention, at least in preferrred forms, is to provide a simple and low-cost technique for detecting open circuit and short circuit conditions and also to provide protection under such situations.

Because the inverter dc voltage $V_{dc}$ is regulated, open circuit (o/c) and short circuit (s/c) protection can be realized by sensing the input current to the inverter without actually sensing the lamp voltage and lamp current. The total active power supplied to the inverter will theoretically be transferred to the lamp. The major reasons are 1) the power loss on the inverter is relatively small when compared with the lamp power and 2) the lamp network that consists of reactive components basically draws reactive power. The o/c and s/c protection scheme is achieved by recognizing that the active power consumed by the inverter and lamp network is very small (for example, approx. one-tenth of the rated value), because there is no active power consumed by the lamp under the o/c and s/c conditions. If either o/c or s/c condition occurs, the input current to the inverter becomes smaller than a small reference level $I_{sc,ref}$. The signal ISC becomes '1', indicating that an o/c or a s/c condition has occurred.

However, in the starting process of the lamp, the lamp resistance goes through several stages: infinite resistance (off state), very low resistance (intermediate state), and high resistance (steady state). In order to avoid the protection, circuit from confusing the intermediate state as o/c or s/c, this protection scheme will be deactivated for a short period after the lamp has been ignited. A typical setting is 0.66 second.

C.5 Accelerated Start-up Process

In general, HID lamps such as metal-halide (MH) lamps need typically 1 to 10 minutes to generate their full brightness after ignition. This period is termed 'bright-up time' here. A preferred feature of the present invention is that it provides a simple way to shorten this bright-up time.

In order to warm up the plasma temperature inside the HID lamp quickly, the initial lamp current can be controlled to be higher (typically 3 to 4 times) than its normal steady-state value for about 20 seconds to 30 seconds after ignition. The $I^2R$ power of this relatively large initial current and the lamp resistance provides energy to warm up the lamp's plasma so that it can reach its steady-state temperature quickly.

It will thus be seen that the present invention, at least in its preferred forms, provides an improved electronic ballast which is physically small and compact in size, and which prevents acoustic resonance in the lamp. In addition the ballast can maintain the lamp arc during the startup short-circuit transition in order to ensure fast discharge process during turn on of the lamp even if a long connection cable is used between the ballast and the lamp.

A further advantage of the present invention is that it provides a ballast with enhanced safety features including a simple arrangement to perform open-circuit and short-circuit protection, and means to limit the rms value of the ignition or open-circuit voltage for safety reasons. The ballast further includes means to limit the voltage across the lamp connector when the lamp is suddenly taken out or when the lamp fails to operate suddenly, and is able to ensure soft-switching condition for the switching devices when the lamp is suddenly taken out or when the lamp fails to operate suddenly

The invention claimed is:

1. An electronic high intensity discharge lamp ballast, comprising: an inverter circuit and a resonant circuit, wherein at least one ignition capacitor is provided directly between the resonant circuit and the lamp, and said at least one ignition capacitor is immediately across the lamp, and wherein two ignition capacitors are provided in parallel with each other, a first of said ignition capacitors being located physically proximate to said inverter circuit and said resonant circuit, and a second of said ignition capacitors being located proximate the lamp and separated from the first ignition capacitor by a cable.

2. An electronic high intensity discharge lamp ballast as claimed in claim 1 wherein said inverter circuit comprises two switches and wherein means are provided for varying a switching frequency of said inverter circuit.

3. An electronic high intensity discharge lamp ballast as claimed in claim 2 wherein said inverter circuit is operated at a low frequency during an ignition step and at a high frequency during steady state operation.

4. An electronic high intensity discharge lamp ballast as claimed in claim 2 wherein means are provided for regulating the lamp power during steady state operation by varying the switching frequency of the inverter.

5. An electronic high intensity discharge lamp ballast as claimed in claim 4 wherein means are provided for monitoring lamp power by monitoring a dc link current, and wherein said switching frequency of said inverter is varied in response to an output from a current controller.

6. An electronic high intensity discharge lamp ballast as claimed in claim 1 wherein means are provided whereby if ignition fails the ballast is disabled and a further attempt to ignite the lamp is made after a preset time interval.

7. An electronic high intensity discharge lamp ballast as claimed in claim 6 wherein success or failure of ignition is detected by comparing a lamp current with a reference current, and wherein if ignition succeeds and the lamp current is higher than the reference current, the ballast is then operated at a high switching frequency.

8. An electronic high intensity discharge lamp ballast as claimed in claim 6 wherein when an attempt to ignite the lamp is made an ignition voltage is generated for a relatively short duration only such that even if repeated attempts are made to ignite the lamp an rms lamp voltage remains below a preset value determined by safety considerations.

9. An electronic high intensity discharge lamp ballast as claimed in claim 1 further comprising means for detecting a short-circuit or open circuit condition at said lamp.

10. An electronic high intensity discharge lamp ballast as claimed in claim 9 wherein said short-circuit and open circuit detecting means comprises means for detecting when a dc link current falls below a reference value.

11. An electronic high intensity discharge lamp ballast as claimed in claim 9 wherein said short-circuit and open circuit detecting means is not activated during a lamp ignition step.

12. An electronic high intensity discharge lamp ballast as claimed in claim 1 further comprising means for maintaining a lamp current at a level higher than a steady state level for a predetermined period of time following ignition to accelerate warminig of a lamp plasma.

13. An electronic high intensity discharge lamp ballast as claimed in claim 1 wherein an ignition frequency of said inverter circuit is less than a steady-state frequency of said inverter circuit.

* * * * *